E. J. STROUT.
COLTER.
APPLICATION FILED NOV. 16, 1921.
1,425,422.
Patented Aug. 8, 1922.
Fig. 1.
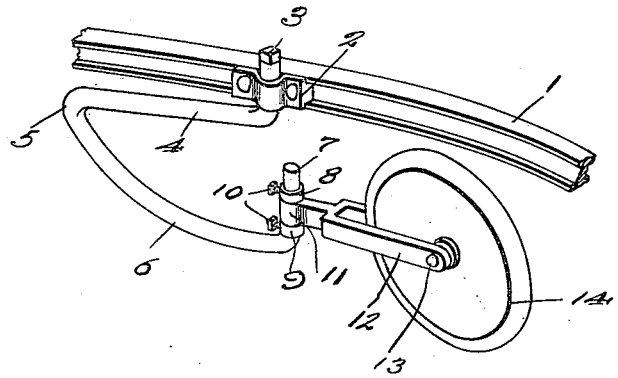
Fig. 2.
Fig. 3.
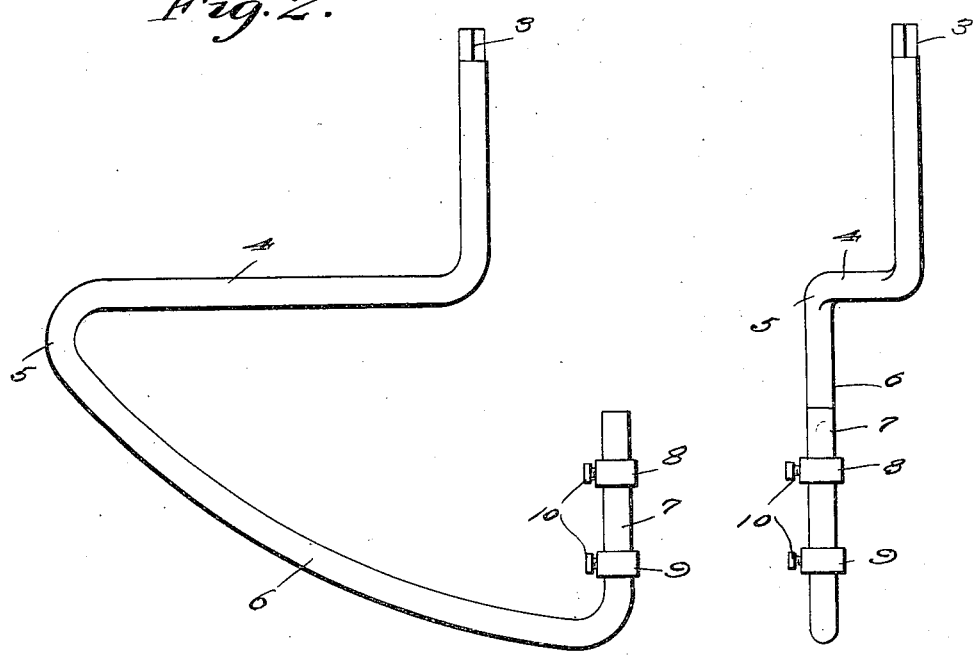
E. J. Strout
INVENTOR
BY Victor J. Evans
ATTORNEY
WITNESSES

UNITED STATES PATENT OFFICE.

ELMER J. STROUT, OF UTICA, ILLINOIS.

COLTER.

1,425,422.    Specification of Letters Patent.    Patented Aug. 8, 1922.

Application filed November 26, 1921. Serial No. 517,978.

*To all whom it may concern:*

Be it known that I, ELMER J. STROUT, a citizen of the United States, residing at Utica, in the county of La Salle and State of Illinois, have invented new and useful Improvements in Colters, of which the following is a specification.

My present invention has reference to a colter mount.

The ordinary mount for colters is in the nature of a vertically disposed rod which is centrally offset and to which the hanger for the colter shaft is connected. Because of the shape of this rod and the manner in which it extends directly downwardly from the beam of the cultivator the same is brought in direct contact with the weeds, straw, etc., which collect thereon and direct such trash on to the shaft of the colter, so that the driver of the implement is put to the annoyance of stopping his team and tractor and removing such trash before the cultivator properly operates.

The object of the present invention is to produce a colter mount which is of a shape and construction to serve as a deflector for weeds, straw and other trash which are directly in the path of the colter, the said mount engaging such trash in a manner as to direct the same at a downward angle with respect to the colter so that the colter can readily cut therethrough without danger of its shaft being clogged thereby.

The drawing illustrates a satisfactory embodiment of the improvement reduced to practice, and wherein:—

Figure 1 is a perspective view illustrating a colter mounted in accordance with this invention.

Figure 2 is a side elevation of the mount, with the colter removed.

Figure 3 is an edge view of the mount.

Referring now to the drawings in detail, the numeral 1 designates the beam of a cultivator, 2 the usual clamping bracket thereon for the mount of a colter. In the present instance, my improved mount is formed from a rod or bar of metal and includes the cross sectionally rectangular end of shank portion 3, which passes through the bracket 2 and is clamped by the bracket on the beam 1. The rod is preferably round in cross section and is formed with an angle extension 4 which is directed toward the front of the cultivator and is disposed parallel with the beam 1 thereof. The portion or arm 4 has its outer end rounded, as at 5, and is from thence curved inwardly and downwardly to provide the second arm 6 of the mount. The arm 6 has its end upwardly directed, as at 7, and on the said portion 7 there are two spaced collars 8 and 9 respectively. Each of these collars has threaded therethrough a bolt 10 respectively which binds against the lower shank 7 of the mount. Between the collars and on the shank 7 there is the eye portion 11 of the hanger arm 12 for the shank 13 of a disk colter 14.

The downwardly directed rearwardly curved arm 6 of my mount will, when the cultivator travels over ground planted with straw or having weeds thereon, contact with such growth causing the same to be directed outwardly and downwardly with respect to the beam 1 to arrange such trash in the path of the cutting edge of the disk 14 to permit of the said trash being severed in the rotary action of the colter. With my improvement there is no danger of trash contacting with the collar that supports the hanger on the usual shank, nor with any direct vertical portion of the colter mount. My improvement is extremely simple, may be cheaply manufactured and by providing the stem 7 thereof with the adjustable collars 8 and 9, the hangers 12 for colters of different sizes may be readily supported thereon.

It is, of course, to be understood that the rectangular end of portion 3 of the mount is designed for engagement between the jaws of a wrench for adjusting the mount on the plow beam. It will be further apparent that the colter may be adjusted to cut deep or shallow by raising or lowering the colter arm 12 on the lower shaft 7 and clamping the collars 8 and 9 on the end of the mount.

Having described the invention, I claim:—

A colter mount for cultivators, comprising a member formed to provide a straight shank which is clamped to the beam of the cultivator, said member having an arm extending from the shank parallel with the beam and directed toward the front of the cultivator, said arm having its end rounded upon itself and extended at a curvature in an outward and downward direction to provide a second deflecting arm, said last mentioned arm having its end formed with an upwardly directed stem, spaced collars on the stem, binding means for the collars, and said stem designed to have arranged thereon and to be received between the collars the eye portion for the hanger of the shaft of a disk colter.

In testimony whereof I affix my signature.

ELMER J. STROUT.